Oct. 26, 1965  S. R. RICH  3,213,592
LIQUID TREATMENT
Filed Feb. 21, 1963  3 Sheets-Sheet 1
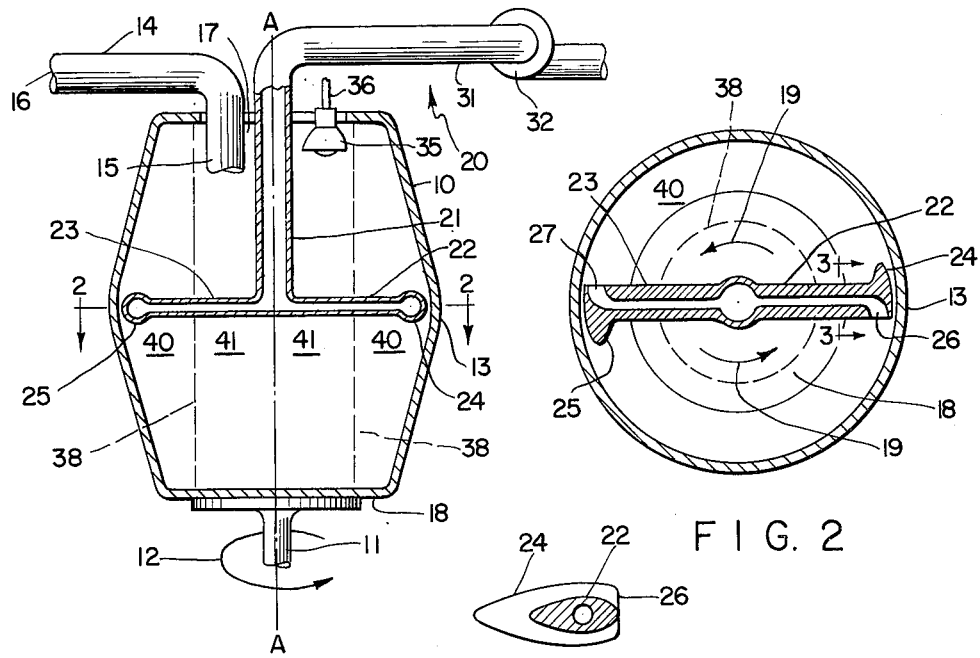
FIG. 1
FIG. 2
FIG. 3
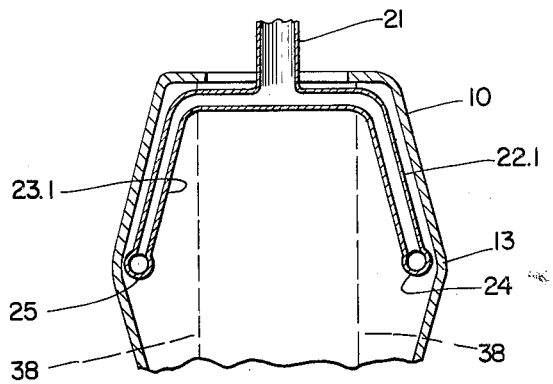
FIG. 4
INVENTOR.
STANLEY R. RICH
BY
ATTORNEY

INVENTOR.
STANLEY R. RICH
BY
ATTORNEY

Oct. 26, 1965   S. R. RICH   3,213,592
LIQUID TREATMENT
Filed Feb. 21, 1963   3 Sheets-Sheet 3

INVENTOR.
STANLEY R. RICH
BY
ATTORNEY

United States Patent Office 3,213,592
Patented Oct. 26, 1965

3,213,592
LIQUID TREATMENT
Stanley R. Rich, West Hartford, Conn., assignor, by mesne assignments, to Northern Industries, Inc., Dover, Del., a corporation of Delaware
Filed Feb. 21, 1963, Ser. No. 260,177
8 Claims. (Cl. 55—15)

This invention relates to the treatment of liquids to separate gas and gas-bearing components, such as foam, and/or gas particle entrainment from a liquid, and more particularly to methods and means for separating such components from a liquid containing suspended solids, without simultaneously separating such solid components from the liquid.

Many liquids, particularly those containing suspended solids, such as paper coatings, those having proteinaceous components, and latices, produce types of foam, when agitated, stirred or otherwise subjected to action which will cause gas to become entrained in them, which types are tenaceous and difficult to eliminate with techniques thus far available. This is believed to be due to the fact that such types of foam and gas entrainment are constructed of bubbles having skins characterized by a high order of surface strength, and frequently having the regions between them filled with liquid. Such a combination of bubbles having a strong skin with the regions between them filled to a substantial extent with liquid, stubbornly resists squeezing, or vibrating the foam, and even treating it with heat and vacuum, or the combination of any or all of these, at levels or in quantities which will not at the same time be injurious to the liquid being treated.

It is one of the principal objects of the present invention to break stubborn and persistent types of foam without bringing about injury or damage to the liquids accompanying them. More particularly, it is a principal object of the invention to break such types of foam with novel applications of elastic wave energy, and dynamic forces, and to provide novel methods and means to apply gas-borne elastic wave energy to this purpose.

According to the invenion in one of its general aspects, a liquid containing foam or entrained gas is treated first to separate the foam or gas from the body of the liquid, and then, after separation from the liquid, the foam is broken by elastic wave energy. I have discovered that if a mass of foam bubbles intersticially filled with liquid is first treated to drain liquid from the bubbles, so that the foam bubbles become in effect cells filled and/or surrounded essentially only with a gas, it becomes a relatively easy matter to break the foam bubbles with elastic wave energy, no matter how tough or tenacious the bubble skins may be. Conveniently, foam, along with gas which may be entrained in a liquid, is separated from the liquid according to the invention by centrifugation, whereby the foam is removed from the body of the liquid. Then, elastic wave energy is applied to the collected foam only. Thus, more particularly, the invention contemplates the method of separating foam and/or gas from a liquid by subjecting liquid bearing the same to centrifugation, and subjecting the foam to elastic wave energy. Apparatus according to the invention comprises means to centrifuge a liquid and, in combination therewith, means to apply elastic wave energy to the central or axial region of the centrifuge means.

When the liquid under treatment contains suspended solids, such as a paper coating, it is obviously desirable to preserve the solid suspension in the liquid during the separation of foam and gases therefrom. I have discovered that a relatively low angular velocity of centrifugation, producing about 10 to 50 $g$'s of centrifugal acceleration, will separate foam and gases without separating suspended solids from a liquid. Accordingly, it is a more particular object of the invention to provide novel methods and means to separate foam and/or gases from a liquid containing suspended solids without noticeably affecting the suspension of solids in the liquid. Further and more specific objects are to provide means to centrifuge a liquid containing suspended solids at an angular velocity which will separate foam and/or gas therefrom without noticeably separating suspended solids therefrom, and to subject the foam after separation from the liquid to gas-borne elastic wave energy to break the foam.

More specific objects are to provide methods and means to separate foam and/or gas from a liquid on a continuous basis. Accordingly, the invention contemplates the method for separating foam and/or gas from a liquid comprising the steps of continuously introducing liquid-bearing foam and/or gas into a separation region, continuously treating said liquid in said region to separate foam and/or gaseous components from the liquid, continuously removing degased liquid from said region after such treatment, and continuously subjecting foam components to elastic wave energy.

From another point of view, the present invention contemplates a centrifugal device for separating foam and/or gas components of a body of liquid which contains one or more of such components, in combination with means to defoam the centrifuged input to the device and means to extract from said centrifugal device only the defoamed and/or degased liquid as the output thereof.

The invention will now be described with reference to the accompanying drawings, wherein:

FIG. 1 is a vertical axial section of a centrifugal separator according to the invention;

FIG. 2 is a cross-section along line 2—2 of FIG. 1;

FIG. 3 is a cross-sectional view of a part of FIG. 1 taken along line 3—3 in FIG. 2;

FIG. 4 is a partial vertical axial section of a modification of FIG. 1;

Figure 5:
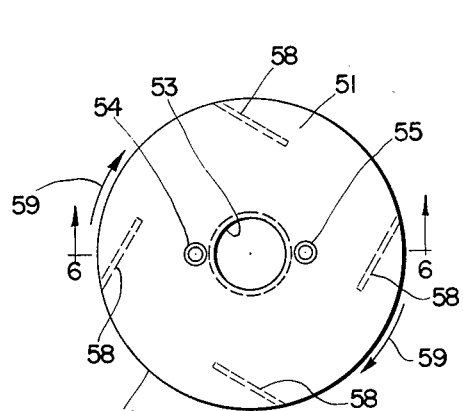
FIG. 5 is a top plan view of a component which may be substituted in FIG. 1.

Referring to FIGS. 1, 2 and 3, a rotatable tub 10, open at the top 17 and having the shape of a figure of revolution around an axis A—A which is vertically disposed, is mounted at the bottom 18 on a shaft 11 which may be turned by a suitable prime mover (not shown), such as an electric motor, to rotate the tub around the axis A—A, as is indicated by the curved arrow 12 in FIG. 1, and curved arrows 19 in FIG. 2. The tub has side walls tapered toward a region 13 of larger diameter than the remainder of the tub. An input pipe 14 is disposed at the top 17 of the tub with its discharge end 15 oriented to discharge into the tub through the open top 17. The remaining end 16 of the input pipe will in practice be connected to a source (not shown) of gas-bearing liquid to be treated.

An output pipe assembly generally designated 20, comprises a vertical output pipe 21 having mounted to its lower end a pair of cross-pipes 22 and 23 extending in opposite directions therefrom diametrically across the tub 10 in the wider region 13. Each cross-pipe has an external cross-sectional shape which is sharply stream-lined, as is indicated in FIG. 3, which shows a cross-section of the first cross-pipe 22. Each cross-pipe 22 and 23 has at its free end a streamlined scoop 24 and 25, respectively, oriented with its mouth 26, 27 respectively opening into the oncoming liquid which may be present in the tub during rotation thereof in the direction of the arrows 12, 19. The first scoop 24 is shown in side view in FIG. 3. The output pipe assembly is non-rotatably fixed on the axis A—A, as is represented symbolically by a mounting 30 outside the tub 10, and does not rotate with the tub. The vertical output pipe 21 communicates with a horizontal output pipe 31, which further communicates with a pump 32.

A generator 35 of gas-borne elastic wave energy is disposed in or near the open top 17 of the tub, oriented to radiate elastic wave energy through the top into the central axial region 41 therein. A feed pipe 36 is provided for bringing in driving gas to the generator 35 from a source (not shown). The generator 35 may be of any suitable type, such as a siren, or a hollow resonator type as exemplified by Amy Patent No. 1,980,171. The driving gas may be compressed air, nitrogen, or any other suitable gas; depending on the nature of the liquid being treated, in some cases steam (dry or wet) may be used.

In operation, the tub 10 is rotated about the axis A—A at a suitable angular velocity, for example as specified below, and liquid to be treated is introduced via the input pipe 14. The quantity of liquid is regulated so that it occupies the outer annular portion of the interior of the tub, as demarcated for example by the vertical dashed lines 38, 38 in FIG. 1; these lines are a vertical section of an annular boundary 38, as is represented in FIG. 2. If one considers that, during rotation of the tub 10 centrifugal force throws the liquid to the annular region 40 of the tub outside the boundary 38, the boundary may be considered as the level of the liquid in the tub, referred to the "gravitational" force due to cenrtifugation. The central axial region 41 within the boundary 38, including the axis A—A, is then the region above the liquid level 38. During rotation of the tub 10, then, the liquid under treatment is maintained at the level 38 and the region 41 above the liquid is occupied by foam and/or gas components of the input liquid. An arrangement for maintaining a desired liquid level 38 during the continuous operation of the invention is described below in connection with FIG. 13.

The angular velocity of rotation of the tub is chosen so that foam and/or gas components of the input liquid will be readily separated by centrifugal force, but solids which may be suspended in the liquid (as set forth in Example I below) will not be significantly disturbed. The present invention takes advantage of the fact that the density ratio of liquid to gas is about 800/1, at "standard" conditions of atmospheric pressure and room temperature, whereas the greatest realizable density ratio between a solid and a liquid is about 20/1; and normal ratios are usually smaller than 3/1 in such materials as clay-bearing paper coatings. The expression for centrifugal force is the well-known relation:

$$F = \frac{w}{g}\frac{v^2}{r}$$

Where (if all units are in the English system):
$F$=force in poundals
$W$=weight in poundals of the rotating mass
$g$=32.16 ft./sec.$^2$ $v$=linear velocity in ft./sec., and
$r$=radius in feet If, for example, the radius of the tub 10 is 0.75 ft. (9 inches) in the region 13, and the rotational velocity is 300 r.p.m., the linear velocity "$v$" at the outer periphery of the tub in the region 13 is $$v = \frac{300 \times 2\pi r}{60} \text{ ft./sec.}$$

$$= 10\pi r = 24 \text{ ft./sec. (approx.)}$$

The expression for centripetal acceleration "$a$" in uniform circular motion is $$a = \frac{V^2}{r}$$

In the present example $$\frac{v^2}{r} = \frac{24^2}{0.75} = 576 \times \frac{4}{3} = 192 \times 4$$

$$a = 768 \text{ ft./sec.}^2$$

$$= 24 g$$

Thus, in the present example, the centripetal acceleration produced at 300 r.p.m. is 24 $g$. The centrifugual acceleration may be termed "G." In general, $$G = \frac{v^2}{r} \times \frac{1}{g}$$

The liquid in the rotating tub 10 may be, for example, about 3 to 4 inches "deep," where the term "deep" refers to centrifugal "gravity" and is measured between the level 38 and the outer side walls of the tub. The pressure per square inch, due to centrifugal action, is due then to 3 to 4 inches of liquid times 24 (in the present example), which yields the equivalent of a liquid column about 6 to 8 feet in height, referred to the terrestrial vertical. Thus, if at 300 r.p.m. the pump 32 is capable of lifting liquid at least eight feet, it can pump liquid from the tub through the scoops 24 and 25 without regard to the relative motion between the liquid rotating in the tub 10 and the scoops. In the present embodiment (FIGS. 1–3) relative motion between the liquid in the "lower" centrifugal region 40 and the scoops 24 and 25 drives liquid into the scoops, so that use of the pump 32 may be optional. However, in certain other embodiments, such as that of FIGS. 10 and 11 to be described below, such a pump may be employed to advantage.

Centrifugation at an angular velocity which produces centrifugal gravity G of the order of 10 to 50 $g$ (approximately) will readily separate gaseous and foam components from a liquid without noticeably disturbing a suspension of solids in the liquid, as may be found in a clay-bearing paper coating for example. When treating a liquid with such centrifugation, liquid is promptly drained from the walls and/or interstices of any foam that may be present with the liquid, and a substantially liquid-free foam is left in the inner axial region 41. Such a foam is easily broken with gas-borne elastic wave energy having an intensity of more than 0.1 watt per square centimeter (approximately), whereupon the gas contained in the foam bubbles is released and the liquid comprising the skin returns to the body of the liquid in the outer annular region 41. Thus, the liquid is all recaptured, or salvaged, and the gas is separated. The output from the output pipes 21–31 is for all practical purposes gas-free and foam-free liquid.

If the elastic wave energy is omitted, the result is the flooding of the apparatus with foam, which can then, and frequently does, overflow the rotating tub. In fact, until the advent of the present invention, foam represented a common and difficult problem whenever a conventional centrifuge had to be employed with a liquid that produced foam easily. Examples are the foams that are nearly always present in the output of centrifuges employed in the manufacture of coffee extract and potato starch. The present invention has been found useful in eliminating the foam produced by coffee-liquor centrifuges, as described in one of the examples cited below.

Example I

Polyvinylidene chloride latex paper coating containing clay solids in suspension was taken from the "air knife" catch pan which received the "blow-off" from a paper coating machine. A sample of the polyvinylidene chloride latex at this point showed air entrainment of 80% air compared with 20% liquid by volume. Passing this material through a realization of the present invention resulted in reduction of foam and air entrainment both so that the output of the apparatus contained less than 1% air by volume. It was found that the apparatus could be so adjusted that air entrainment was reduced to less than 0.1% by volume of the effluent liquid removed from the apparatus. The solids suspended in the liquid were not noticeably disturbed.

Example II

Milk with entrained air due to being pumped rapidly by centrifugal pumps was introduced into an apparatus constructed in accordance with the principles of the present invention. An initial air entrainment of 10% by volume of the total input was reduced to less than 0.1% on a single pass through the apparatus.

Example III

The output of a centrifuge used to separate coffee grounds from concentrated coffee liquor was passed through an apparatus constructed in accordance with the present invention. in this case, the entire output of the centrifuge was a coffee foam. This foam proved to have a stability such that the foam, left untreated, remained standing substantially without change for a period of eight hours. On passage through the present apparatus, the foam was reduced to air entrainment of less than 0.1% in one pass through the apparatus.

Example IV

Polyvinyl chloride latex was passed through an apparatus constructed in accordance with the present invention. Vinyl chloride monomer gas produced a dense-tight foam which was more than 50% vinyl chloride gas by volume. Passage through the present apparatus liberated substantially all of the gas and the resulting polyvinyl chloride polymer latex effluent from the output of the apparatus retained less than 0.1% of the original vinyl chloride monomer.

Example V

"Black liquor" foam, produced during the digestion of wood pulp in accordance with the sulphate process was passed into an apparatus constructed in accordance with the present invention. Nearly instantaneous reduction of foam to liquid black liquor was effected and the effluent from the apparatus contained less than 0.1% air per unit volume.

In all of the foregoing examples, both foam and air entrainment was substantially eliminated in a single pass through an apparatus constructed and operated in accordance with the present invention.

As is mentioned above, depending on the nature of the liquid being treated, in some cases steam may be used as the driving gas for the generator 35. I have found that some liquids, such as a paper coating containing solids in suspension, may, after treatment according to the present invention using air as the driving gas for the generator 35, evolve air upon standing. This happens about half an hour after the treatment, in which time a tight foam is spontaneously produced which approximately doubles the volume of the treated liquid. I have found further that if this same material, after spontaneously foaming, is treated again according to the invention, but this time using steam as the driving gas for the generator 35, the foam is completely broken, the volume of the liquid returns to its original volume and spontaneous generation of foam does not again occur. It is hypothesized that some entrained solids can apparently hold, either by adsorption or absorption, air used in driving the generator, which air is subsequently released into the liquid. The use of steam in place of air effectively excludes air from ambient region in tub 10 above the liquid, and in which the foam is disposed, thereby preventing the retention of air in the treated liquid. It is believed that any vapor which is compatible with the liquid under treatment can be used in place of steam to provide the same advantages in cases of this kind.

Some liquids have ingredients which are highly prone to produce foam upon the slightest agitation. Even the streamlined cross-pipes 22 and 23 may produce foam in small quantities by disturbing the liquid surface at the boundary 38. Since such foam will originate at the same level (referred to the terrestrial vertical) as the scoops 24, 25, it may be carried around by the liquid and enter the scoops. The modification of FIG. 1 which is illustrated in FIG. 4 helps to reduce and substantially to eliminate the possibility of this event. In FIG. 4 the cross pipes 22.1 and 23.1 have a substantially vertical direction (referred to the terrestrial vertical), and carry the scoops 24, 25, respectively at their lower ends. They meet the vertical output pipe 21 near the top of the tub 10. With this construction, any foam that may be generated by relative motion between liquid at the surface 38 and the cross-pipes 22.1 and 23.1 will escape from the top of the liquid (referred to the centrifugal vertical) and escape into the inner axial region 41 before it can become entrained in the liquid and encounter one of the scoops. The vertically-oriented pipes 22.1 and 23.1 can be angled slightly with respect to the direction of liquid flow toward the output pipe 21, if desired, to maximize the tendency of any foam bubbles which may be generated at the cross-pipe surfaces in the liquid to rise toward the top of the tub during operation.

Figure 6:
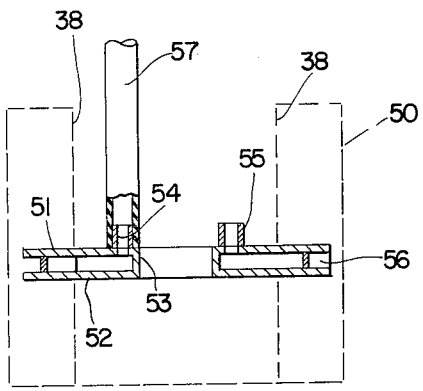
FIG. 6 is a cross-section taken along line 6—6 of FIG. 5.
Figure 7:
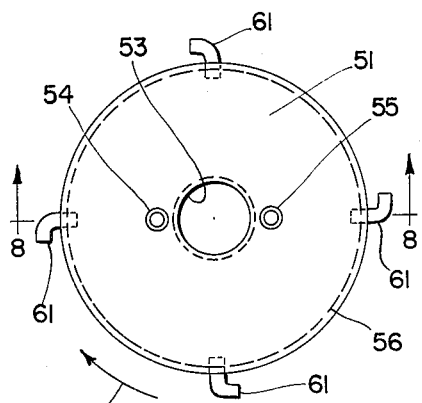
FIG. 7 is a top plan view of another component which may be substituted in FIG. 1.
Figure 9:
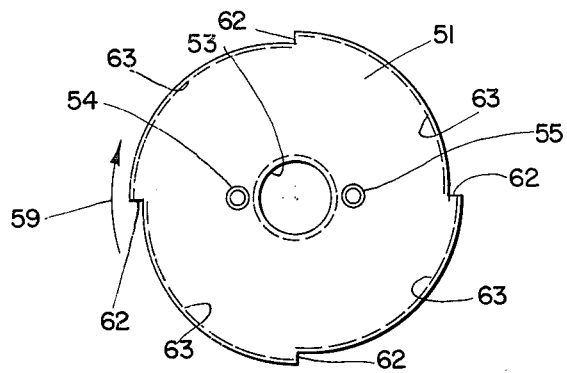
FIG. 9 is a top plan view of another component which may be substituted in FIG. 1.

The possibility, however remote, that foam may be generated by the disturbance created by the motion of the scoops 24 and 25, and the cross-pipes 22 and 23, through the liquid during centrifugation, can be virtually eliminated by substituting a liquid output structure of the general type shown in FIGS. 5, 7 and 9. Referring first to FIGS. 5 and 6, a pair of annular discs 51 and 52 open at the center are spaced apart in register with each other and joined by a cylindrical piece 53 at their respective inner peripheries. The region at their respective outer peripheries is open to form a circumferential gap 56. Pipe nipples 54 and 55 extend upward from the first disc 51 near the inner periphery, and an output pipe, as exemplified by a flexible hose 57, may be connected to each nipple. Vanes 58 are mounted between the discs 51, 52 near the gap 56 for scooping into the space between the discs liquid rotating in the direction of the arrow 59 relative to the discs. The entire liquid output structure may be mounted in a tub, such as the tub 10, as is indicated by the dashed lines 50 in FIG. 6, representing the relative location of a suitable tub. As in FIG. 1, the liquid output structure does not rotate, while the tub is rotatable to impart to the liquid therein motion in the direction indicated by the arrows 59. Rotation of the tub will thus cause liquid therein to move to the peripheral region of the discs 51 and 52 and to enter the gap 56, where the vanes 58 deflect the liquid toward the center and into the output pipes 54, 55. Foam which may be present is forced to the central region of the tub outside the discs 51 and 52, where it is dealt with as in FIG. 1. Obviously, the output pipes may be coupled to a pump, as shown in FIG. 1, if desired. The discs 51 and 52 being continuous annular bodies, do not represent any discontinuities to liquid in the direction of liquid flow in the tub, and therefore eliminate even the small discontinuities which may be presented to flowing liquid by the scoops 24, 25, and the cross-pipes 22 and 23. As is shown in FIG. 6, the liquid surface 38 is coincident with annularly continuous surfaces of the discs 51 and 52.

Figure 8:
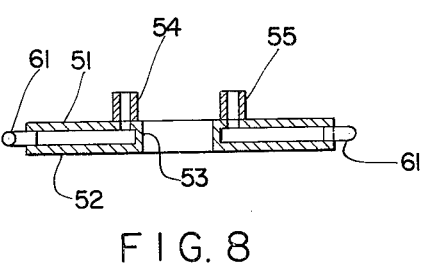
FIG. 8 is a cross-section taken along line 8—8 of FIG. 7.

FIGS. 7 and 8 illustrate a modification of the liquid output structure of FIGS. 5 and 6 in which scoops 61 are substituted for the vanes 58. The two structures are otherwise the same. The disturbance created by the scoops 24 and 25 (FIG. 1) below the surface 38 is of so little significance as compared with the disturbance created at the surface 38 that scoops 61 may be used in place of the vanes 58 with no noticeable change in performance. As in FIG. 5, the structure of FIG. 7 presents a continuous annular surface to liquid at the surface 38.

FIG. 9 illustrates still another modification of the structure according to FIG. 5, in which the edges of the discs 51 and 52 are serrated to present scoop openings 62 to liquid rotating relating thereto in the direction of the arrow 59. In this embodiment, the peripheral edges of the discs between the scoop openings 62 are closed by wall members 62, represented by dashed lines.

Figures 10, 11:
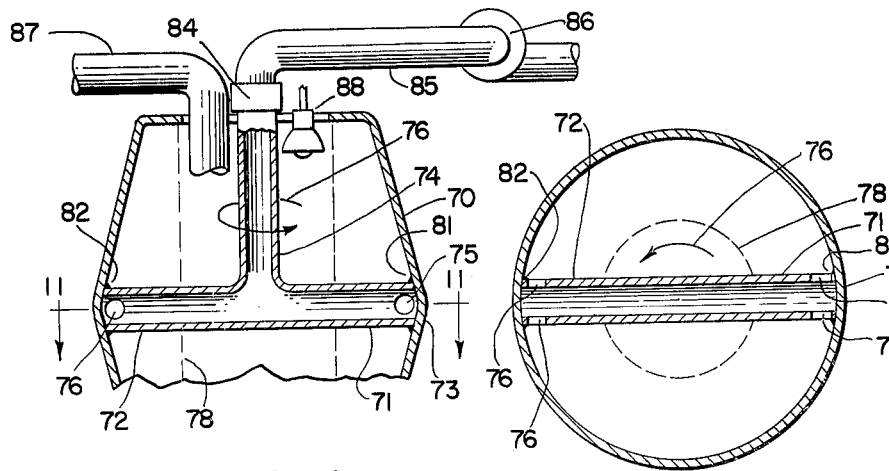
FIG. 10 is a partial vertical axial sectional view of another embodiment of the invention.
FIG. 11 is a cross-section along line 11—11 of FIG. 10.

In FIGS. 10 and 11, the tube 70, corresponding to the tub 10 in FIG. 1, has cross-pipes 71 and 72 permanently mounted therein at a wide region 73, and connected to an axially disposed vertical output pipe 74. The cross-pipes 71 and 72 have apertures 75, 76, respectively, through their walls at their ends 81, 82, respectively, near the side walls 73 of the tub, and below the liquid surface 78. These ends 81, 82 of the cross-pipes are affixed, as by welding, to the tub, and the cross-pipe and output pipe assembly 71, 72, 74 rotates with the tub 70, as is indicated by the curved arrows 76 in FIGS. 10 and 11. The vertical output pipe 74 is coupled through a rotary shaft seal 84 to a horizontal output pipe 85, and thence to a pump 86. The shaft seal 84 may be any one of the commercially available seals which permits relative axial rotation between rotation between two pipes (76, 85) coupled thereby. An input pipe 87 corresponding to the input pipe 14 in FIG. 1, and a generator 88 of gas-borne elastic wave energy, corresponding to the generator 35 in FIG. 1, are provided for the same purposes as in FIG. 1.

In operation, the apparatus of FIG. 10 works in the same manner as the apparatus of FIG. 1, with the exception that, there being no relative motion between the cross-pipes 71, 72 and liquid in the tub 70, the pump 86 is relied upon to remove defoamed and/or degased liquid from the tub. As is developed above, the pump need be capable only of lifting liquid at least 6 to 8 feet, or in some embodiments about 11 feet. The sealing requirements on the rotary shaft seal 84 are equally modest.

Figures 12, 13:
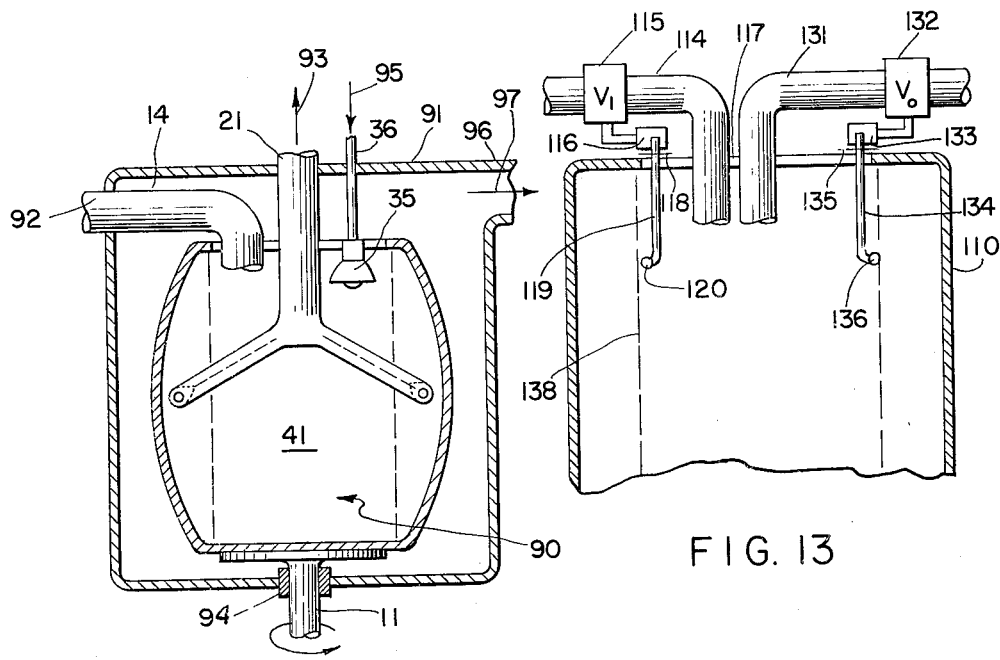
FIG. 12 is a vertical axial section of still another embodiment of the invention.
FIG. 13 illustrates partly schematically a means to control the invention for continuous operation.

In FIG. 12, an embodiment of the invention according to FIG. 1, modified somewhat according to FIG. 4, and generally designated by the reference character 90, is enclosed in a housing 91. Liquid is introduced via the input pipe 14 through the housing wall, as is indicated by an arrow 92, and defoamed and/or degased liquid is removed via the vertical output pipe 21 through the housing wall as is indicated by the arrow 93. Driving gas for the generator 35 is furnished over the gas input pipe 36 passing through the housing wall as is indicated by an arrow 95. The tub shaft 11 passes through a bearing 94 in the lower housing wall, which is preferably gas-tight. With this arrangement, gas evolved from liquid in the tub upon breaking foam in the axial region 41 may be retained by the housing 91 and controllably removed therefrom through a gas output pipe 96, as is indicated by an arrow 97. If desired, this pipe 96, may be connected to an evacuation pump (not shown), and the region inside the housing 91 may be operated at a partial vacuum. This arrangement is particularly suitable for separating and/or recovering noxious or valuable gases from a liquid. It is for example particularly suitable for use in Example IV given above.

For continuous operation of apparatus according to the invention, it is desirable so to regulate the liquid input to and output from the apparatus that the liquid level (38 in FIG. 1 or FIG. 4; 78 in FIG. 10) remains substantially constant. It is obviously not desirable to permit the liquid level to fall so low that the scoops (24, 25 in FIGS. 1 or 4; 75, 76 in FIG. 10) are exposed to gas or foam, or to rise so high as to occupy the axial region reserved for foam. In FIG. 13, which shows a tub 110 in partial vertical section, the liquid level is indicated at 138. The tub is open at the top 117. The input pipe 114 is fitted with an input control valve 115 (labelled $V_1$), and the output pipe 131 is fitted with an output control valve 132 (labelled $V_0$). These valves may be of the solenoid-operated type. The input control valve 115 is connected to an input control switch 116, while the output control valve 132 is connected to an output control switch 133. These may be micro-switches, for example. An input control lever 119 is pivotally mounted at 118 near the top edge of the tub, and is fitted at its lower end with a streamlined liquid sensor 120, which is located above the liquid level 138. An output control lever 134 is pivotally mounted at 135 near the top edge of the tub, and is fitted at its lower end with a streamlined liquid sensor 136 which is located at the desired liquid level 138. The input control lever 119 is so arranged that, when its sensor 120 is out of contact with liquid in the tub, the input control valve 115 is open, and this valve is closed if the liquid in the tub rises sufficiently above the desired level 138 to make contact with the sensor 120. The output control level 134 is so arranged that, when its sensor 136 is out of contact with liquid in the tub, the output control valve 132 is closed, and this valve is opened when liquid in the tub rises to the desired level 138. Clearly, since the invention breaks foam in the axial region in the tub, there is no need to be concerned with any possible drag of foam on the levers 119 and 134 or on their respective sensors. It is also to be understood that the arrangement shown in FIG. 13 is but schematic showing of the control arrangement.

An alternative arrangement for controlling the quantity of liquid in the tub, which is not illustrated, provides means effective to weigh the apparatus or the tub and its contents. Control valves, like the valves 115 and 132 are then operated in accordance with the gross weight, the input valve 115 being open and the output valve 132 closed when the gross weight is below a first prescribed limit, and vice versa when the gross weight is above a second prescribed limit. When the gross weight is between these two limits, both valves are open. A similar consideration is applicable to FIG. 13.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in the art on a reading of the foregoing specification are also within the spirit and scope of the invention, and it is intended that this invention includes all modifications and equivalents which fall within the scope of the appended claims.

What is claimed is:

1. Apparatus for the continuous treatment of a liquid to remove entrained or occluded gas, or both therefrom comprising: a substantially hollow container capable of being rotated on an internal axis, means to rotate said container on said axis at a prescribed angular velocity, liquid receiving means in said container adjacent the periphery thereof to receive liquid rotating within said container, conduit means passing from said receiving means to the exterior of said container, and means located in gaseous space in the interior axial region of said container to irradiate the interior of said container with gas-borne elastic wave energy for breaking foam being simultaneously separated by the previously recited rotating means.

2. Apparatus for the continuous treatment of a liquid to remove entrained or occluded gas, or both therefrom comprising: a substantially hollow cylindrical container, axially vertically disposed and open at the top, a portion of said container intermediate its top and bottom being of enlarged internal diameter, means to rotate said container in its axis at a prescribed angular velocity, liquid scoop means in said portion of said container adjacent the periphery thereof oriented to receive liquid rotating within said container, conduit means passing from said scoop means to the exterior of said container via said top, and means located in gaseous space in the interior axial region of said container to irradiate the interior of said container with gas-borne elastic wave energy for breaking foam being simultaneously separated by the previously recited rotating means.

3. Apparatus for the continuous treatment of a liquid to remove entrained or occluded gas, or both therefrom comprising: a substantially hollow cylindrical container axially vertically disposed and open at the top, means to rotate said container on its axis at a prescribed angular velocity, liquid scoop means in said container adjacent the periphery thereof oriented to receive liquid rotating in said container, conduit means passing substantially vertically from said scoop means to the exterior of said container, via said top, and means located in gaseous space in the interior axial region of said container to irradiate the interior of said container with gas-borne elastic wave energy for breaking foam being simultaneously separated by the previously recited rotating means.

4. Apparatus for the continuous treatment of a liquid to remove entrained or occluded gas, or both therefrom comprising: a substantially hollow rotatable container axially vertically disposed and open at the top, means to rotate said container on its axis at a prescribed angular velocity, means to introduce such a liquid into said container, means to extract liquid from the peripheral region of said container, means located in gaseous space in the interior axial region of said container to irradiate the axial region of said container with gas-borne elastic wave energy for breaking foam being simultaneously separated by the previously recited rotating means, and means to maintain between prescribed limits the quantity of liquid in said container.

5. The method of continuously removing entrained or occluded gas, or both, from a liquid, which method comprises; continuously delivering a raw liquid charged with entrained or occluded gas into a substantially hollow treating space, centrifugally separating in said space gas and liquid, introducing gas-borne elastic wave energy into the gaseous axial inner region of said space surrounded by said liquid being simultaneously centrifuged and there subjecting the gas and the surface of said liquid facing said inner region to gas-borne elastic wave energy, and separately discharging gas and liquid from said space.

6. Apparatus for the continuous treatment of a liquid according to claim 1 in which said container is open at the top, said axis is a vertical axis, said receiving means is a scoop, said scoop is oriented to receive liquid rotating in said container and said conduit means passes to the exterior of said container via said top.

7. Apparatus for the continuous treatment of a liquid according to claim 4 in which said means to maintain between prescribed limits comprises a liquid sensor connected to control flow through said means to extract liquid.

8. The method of continuously removing entrained or occluded gas according to claim 5 in which said entrained or occluded gas is foam.

References Cited by the Examiner

UNITED STATES PATENTS

| 2,300,761 | 11/42 | Amy | 55—15 |
| 2,712,897 | 7/55 | Kusserow et al. | 55—178 |
| 2,785,765 | 3/57 | Cornell | 55—190 |
| 2,845,137 | 7/58 | Seabald | 55—54 X |
| 2,883,344 | 4/59 | McKinney | 252—361 X |
| 2,889,983 | 6/59 | Macklis | 233—27 |
| 2,981,693 | 4/61 | Browne | 252—361 X |
| 3,026,966 | 3/62 | Asklof | 55—277 X |
| 3,169,561 | 2/65 | Berger et al. | 252—361 X |

FOREIGN PATENTS

| 1,205,610 | 8/59 | France. |
| 300,590 | 2/30 | Great Britain. |

REUBEN FRIEDMAN, *Primary Examiner.*